March 5, 1957 A. F. HICKMAN ET AL 2,783,822
RESILIENT SEAT STRUCTURE
Filed April 1, 1954 3 Sheets-Sheet 3

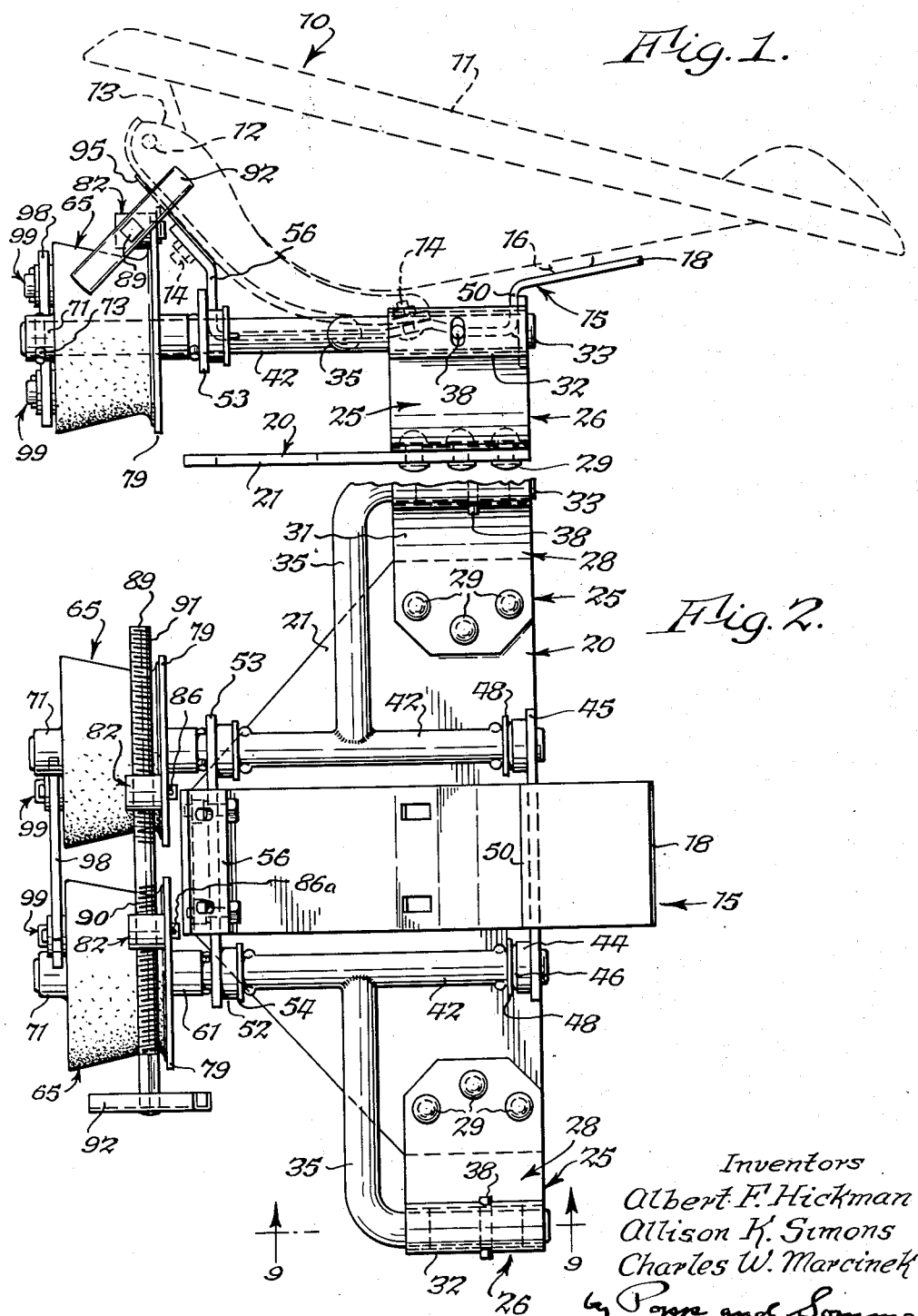

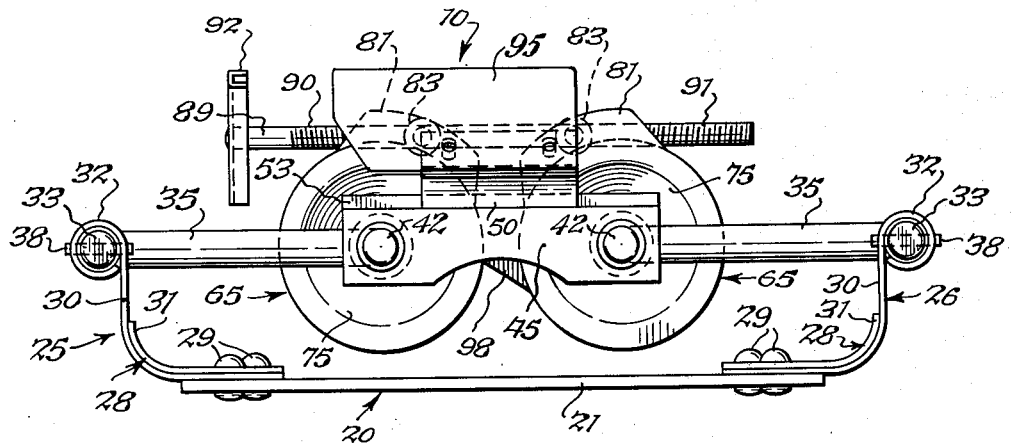
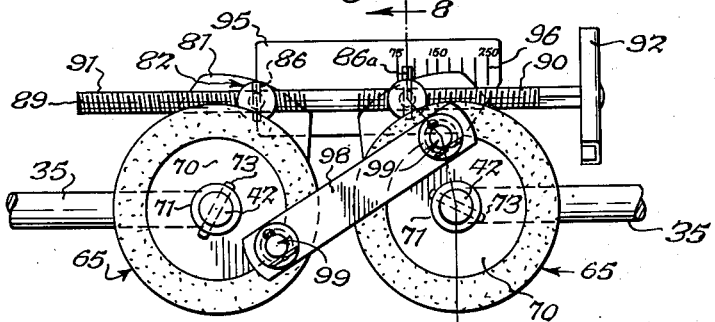
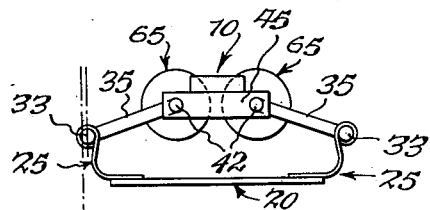
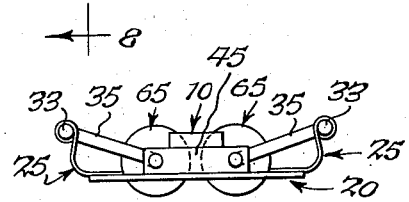
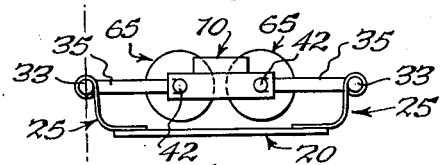
Inventors
Albert F. Hickman
Allison K. Simons
Charles W. Marcinek
by Popaja and Sommer
Attorneys.

Inventors
Albert F. Hickman
Allison K. Simons
Charles W. Marcinek
by Popper and Sommer
Attorneys.

United States Patent Office 2,783,822
Patented Mar. 5, 1957

2,783,822

RESILIENT SEAT STRUCTURE

Albert F. Hickman, Eden, N. Y., and Allison K. Simons, Shorewood, and Charles W. Marcinek, Milwaukee, Wis., assignors to Hickman Industries, Inc., Eden, N. Y., a corporation of New York Application April 1, 1954, Serial No. 420,228

9 Claims. (Cl. 155—50)

This invention relates to a seat structure and more particularly to such a seat structure designed primarily for use with extremely rough riding vehicles such as farm tractors and military vehicles, features of the seat structure being capable of use in railroad locomotives and highway trucks. This application is particularly an improvement upon the resilient seat suspension described and claimed in the Albert F. Hickman patent application 279,127, filed March 28, 1952, now Patent No. 2,691,406, granted October 12, 1954, particularly in adapting the important features of said patent application to tractor seats, although features of the present invention are applicable to other types of seat structures.

In common with said Hickman patent application, important objects of the present invention are to provide a seat structure, (1) in which the seat part is permitted to move against a geometric resilient resistance, both laterally and vertically, relative to the vehicle on which the seat is mounted; (2) which provides the maximum safety and comfort and leaves the occupant in full control of all controls of the vehicle; (3) in which the seat moves with the occupant and is not drawn or jerked away from the occupant whenever the pressure imposed by the occupant upon the seat becomes negative; (4) which will operate in a highly desirable frequency range regardless of the weight of the occupant; (5) which can be designed, within practical limits, to have any desired frequency and any desired resistance curve; (6) which reduces and cushions both the vertical and lateral impacts against the seated occupant without imposing undue thrust on the connections between the seat part and the vehicle; (7) in which torsion springs are employed to provide a longer and a variable spring resistance range; (8) in which the resilient support is provided by torsion springs which are simple, compact, low in cost and have long life and freedom from service difficulties; (9) in which geometric resilient resistance is obtained in a compact structure which requires little servicing and is free from noise; (10) in which the load from the seat part to the suspension means and from the suspension means to its base part is distributed at a plurality of spaced points; (11) in which both fore-and-aft and lateral tilting of the seat is prevented; (12) which is made of a plurality of low cost and sturdy sub-assemblies which can be easily coupled together; (13) which includes a simple and low cost shackle structure and (14) which is extremely compact and sturdy and which will stand up under conditions of severe and constant use with very little servicing.

A specific object of the present invention is to adapt the flexible bodied connectors forming the subject of the said Hickman patent application to a seat for extremely rough riding vehicles, this advantageously involving a substantial rearrangement of the parts, location and form of the principal components of the seat structure forming the subject of said Hickman patent application.

Another object of the invention is to provide a simple and effective stop for limiting particularly the upward movement of the seat part with reference to the base part of the structure, this stop also being effective in determining the pretensioning or so-called windup of the rubber torsion springs.

Another object of the invention is to provide a simple and low cost pointer and calibrated scale which permits the driver to adjust the degree of pretensioning or windup of the rubber springs to suit his particular weight.

Another object of the invention is to provide a rugged and low cost motion transfer device for insuring that the two crank arms forming part of the suspension means oscillate in unison so as to avoid tipping or lurching of the seat.

Another object is to provide a long life and low cost mounting for the rubber torsion springs used as a part of the suspension means, particularly in providing an adequate journalling for the movable end of each rubber spring and to provide a thrust bearing arranged to resist the tendency of the rubber torsion spring to elongate axially.

Other objects and advantages of the invention will be apparent from the following description and drawings in which:

Fig. 1 is a side elevational view of a seat structure embodying the present invention and showing, in broken lines, a seat part including a bucket seat, a base part in the form of a mounting plate, and a suspension means interposed between these parts.

Fig. 2 is a top plan elevation of the seat structure suspension means shown in Fig. 1.

Fig. 3 is a front elevational view thereof.

Fig. 4 is a fragmentary rear elevational view thereof.

Figs. 5, 6 and 7 are diagrammatic front elevational views of the seating structure embodying the present invention and showing the same in different positions, Fig. 5 showing, diagrammatically, the position of the parts when completely unloaded, Fig. 6 showing the position of the parts with the seat normally loaded and Fig. 7 showing the position of the parts under an extreme bump or impact condition such as when the vehicle body is thrown violently upward on encountering an elevation in the field.

Figure 8:
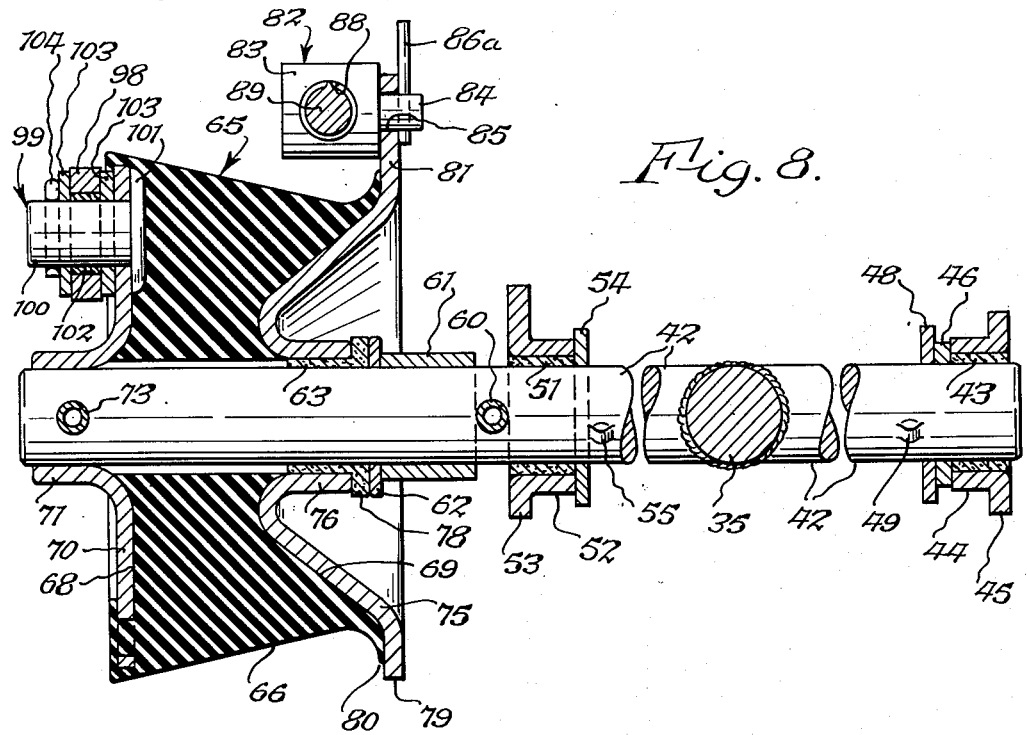

Fig. 8 is an enlarged section taken generally on line 8—8, Fig. 4.

Figures 9, 10:
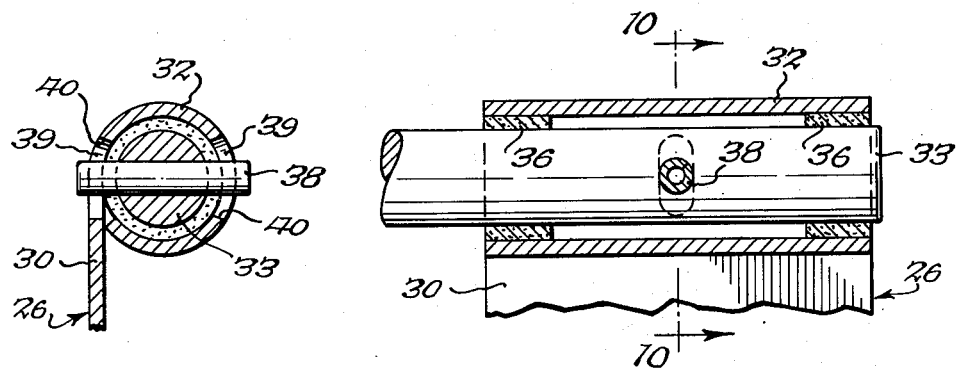

Fig. 9 is an enlarged section taken on line 9—9, Fig. 2.

Fig. 10 is a section taken on line 10—10, Fig. 9.

The vehicle seat structure embodying the present invention is designed primarily for use where rough riding or extreme vertical and lateral impact conditions are encountered, such as with the farm tractors, railroad locomotives and military vehicles, where lateral as well as vertical stability is required, and to this end the seat part 10 of the seat structure is shown as being in the form of a sheet metal bucket type of seat or saddle 11 carried through a hinge 12 by a seat support, which latter is suitably supported, as by bolts 14, to a supporting plate 15 which can be of any suitable contour. The end of the bucket seat 11 opposite its hinge 12 can be supported through a resilient cushion 16 on an extension 18 of the seat supporting plate 15. The parts as above described constitute the seat part 10 of the seat structure as used in the accompanying claims.

This seat part 10 is supported on a base part 20 of the seat structure through the spring suspension means embodying the present invention. While this base part can be of any form to suit the particular installation, it is shown as being in the form of a horizontal plate 21 of generally triangular form in plan.

The spring suspension means of the present invention includes a pair of upstanding flexible bodied connectors 25 mounted on the side extremities of the base plate 21. As best shown in Figs. 2 and 3, each of these connectors 25 comprises an L-shaped metal spring leaf 26 reinforced by a smaller L-shaped metal backing spring leaf 28, These spring leaves of each connector have horizontal end parts which are secured to the base plate 21 by rivets 29. Each spring leaf 26 also has a vertical part 30 which projects upwardly and is arranged fore-and-aft with reference to the seat part 10 so that these upstanding parts 26 at opposite sides of the seat structure are freely flexible transversely of the seat structure. Such flexing is additionally provided by vertical upward extensions 31 of the backing spring leaf 28. The upper extremity of the vertical part 30 of each spring leaf 26 is bent into an open-ended cylinder or sleeve 32. These open-ended cylinders 32 are arranged at the same level parallel with each other and with their axes extending fore-and-aft of the seat structure.

In each of these open-ended cylinders or sleeves 32 is journalled the crank pin 33 at the outer end of a corresponding crank arm 35. Each crank pin 33 is preferably formed by bending the end of the crank arm at right angles. As best shown in Fig. 9 each crank pin 33 is preferably journalled in a pair of bearing bushings 36, 36 fitted in the opposite ends of the corresponding cylinder or sleeve 32. Each of these bearing bushings 36 is preferably made of sintered metal impregnated with a lubricant so as to reduce service requirements.

Means are also provided for limiting the movement of the seat part 10 of the seat structure, particularly for limiting the upward movement of this seat part as hereinafter described in detail.

For this purpose a stop pin 38 extends transversely through each of the crank arm pins 33, and the ends of these pins project outwardly through slots 39, 39 provided in the open-ended cylinders or sleeves 32. These slots are of such length, circumferentially of the cylinders or sleeves 32, that their ends 40 engage the ends of the pins 38 at the end of a predetermined inward movement of the spring leaf parts 30 toward each other to limit the upward movement of the bucket seat 10 as shown in Fig. 5. The downward movement of the bucket seat 10 can be limited by bottoming of the seat part plate 15 on the base plate 21 as illustrated in Fig. 7.

Each crank arm 35 has a fulcrum rod 42 to the center of which the crank arm is welded as best in Figs. 2 and 8. As best shown in Fig. 8, the front end of each fulcrum rod 42 is journalled in a bearing bushing 43 preferably of a lubricant impregnated sintered metal. This bearing bushing is press fitted into a thimble 44 pressed rearwardly from a front supporting plate 45. Each bearing bushing 36 is backed by a pair of thrust washers 46, 48 which are held in operative position by a teat or projection 49 squeezed out of the fulcrum rod 42 on the side of the washer 48 remote from the corresponding bearing 43. The front supporting plate is shown as secured, as by welding, to a vertical part 50, of the forward end of the seat plate 15.

Each fulcrum rod 42 is journalled toward its rear end in a bearing bushing 51 preferably also made of lubricant impregnated sintered metal. Each bearing bushing 51 is press fitted into a thimble 52 pressed forwardly from a rear supporting plate 53. The front side of each bearing bushing engages a thrust washer 54 held in position by a teat or projection 55 squeezed out of the fulcrum rod 42 on the side of the washer 54 remote from the corresponding bearing 51. The rear supporting plate is shown as secured, as by welding, to an integral vertical part 56 of the rear end of the seat plate 15.

A cross pin 60 having projecting ends extends through the outboard end of each fulcrum rod 42 immediately in rear of the rear supporting plate 53 and serves to hold this rear supporting plate 53 against rearward displacement with reference to these fulcrum rods. Each of these cross pins 60 is also engaged by a thrust sleeve 61 which supports a thrust washer 62 against the bearing bushing 63 of a rubber spring 65. Each of these rubber springs can be of any suitable construction and is shown as comprising a generally frusto-conical body 66 of rubber having a flat outer face 68 and a concave inner face 69.

To the outer flat face 68 of each rubber body is vulcanized a metal disk 70 having a hub 71 which fits the rear extremity of the corresponding fulcrum rod 42 and can be secured thereto in any suitable manner as by a cross pin 73. To the opposite concave face 69 of each rubber body is vulcanized a conforming convex metal anchoring member or plate 75, this anchoring plate having a cylindrical hub 76 in which the bearing bushing 63 is press fitted. It will also be noted that this bearing bushing 63 has an outwardly extending flange 78 against which the end of the hub 76 bears, this flange 78 also serving to provide an extended surface for the thrust washer 62.

Each anchoring plate 75 is also provided with an outwardly projecting marginal flange 79. For protection, the corresponding outer edge of each rubber body 66 is preferably in the form of an attenuated or feathered flange 80 which extends outwardly along this flange 79 of the anchoring plate and is vulcanized thereto. The upper part of each marginal flange 79 is extended upwardly to provide an ear 81 and to permit of the ready adjusting of both of the rubber springs 65 to have the same initial degree of tension or windup, the anchoring plates 75 of these rubber springs are preferably adjustably interconnected. For this purpose a swivel pin 82 is mounted in the upward extension 81 of the marginal flange 79 of each anchoring plate 75 of each rubber spring. Each swivel pin 82 oscillates about a horizontal axis parallel with the corresponding fulcrum rod 42. Each of these swivel pins 82 has a greatly enlarged head 83 disposed against the outer face of the ear 81 and also has a round shank 84 extending through a round opening 85 in the corresponding extension 81 of the anchoring plate 75. The swivel pins 82 are retained in position by drive pins 86, 86a and it is a feature of the invention that at least the drive pin 86a is of sufficient length to provide a pointer traversing a scale as hereinafter described.

The enlarged head of each swivel pin 82 is provided with a transverse threaded opening 88 in which is screwed a threaded adjusting rod 89 which extends transversely of the seat structure. The threads 90 at one end of this adjusting rod 89 and threadedly engaging the corresponding swivel pin head 83 are pitched in the opposite direction from the threads 91 on the opposite end of this adjusting rod. One end of this adjusting rod is provided with a transverse handle 92 which is conveniently accessible to the occupant of the seat structure for adjusting the degree of tension or windup of the springs.

A feature of the seat resides in the provision of a calibrated scale by which the seat can readily be adjusted to have a degree of pretension or windup corresponding to the weight of the driver.

For this purpose a thin metal plate 95 is interposed between the rear extremity of the seat supporting plate 15 and the supporting member 13 for the bucket seat 11. This plate is traversed by the drive pin 86a for one of the swivel pins 82, this drive pin being preferably extended upwardly an abnormal distance as compared with the other drive pin 86 so as to provide a pointer traversing the scale 96 provided on the plate 95. The scale can be calibrated in different weights of the drivers so that a driver knowing his own weight can turn the screw 89 until the pin 86a is in register with his particular weight. The seat then has the proper degree of windup or pretension to properly support his weight.

To prevent sidewise tipping or lurching of the seat part 10, the two fulcrum rods 42 are interconnected so as to rotate in unison. The connection between these two fulcrum rods is shown as being in the form of a link 98 pivotally connected at its opposite ends to the metal disks 70 of the two rubber springs 65. For this purpose each of these metal disks 70 has mounted therein a pin 99 the stem 100 of which projects rearwardly and the head 101 of which is embedded in the rubber body 66 as best shown in Fig. 8. The link 98 has an oversize opening at each end through which the stem 100 of a pin 99 extends and a bearing bushing 102 of lubricant impregnated sintered metal is preferably press fitted in each of these oversize openings so as to provide a bearing bushing for the corresponding shank 100 of the pin 99. Each end of the link 98 is preferably flanked by a washer 103 and a cotter pin 104 or the like serves to hold these washers and the link on the shanks 100 of the pins 99.

Assuming the normal loaded position of the seat structure illustrated in Fig. 5, in the operation of the suspension, the upward movement of the tractor, through the base plate 21 and spring leaf connectors 25 moves the outer or free ends of the crank arms 35 upwardly, these outer or free ends being formed to provide the integral crank pins 33 which are journalled in the cylindrical sleeves 32 formed at the upper end of the spring leaf connectors 25. The fulcrum rods 42 of these crank arms 35 oscillate about their bearings 43 and 51. These bearings 43 and 51 are secured in the thimbles 44 and 52 of the front and rear plates 45 and 53 which form a part of the seat part 10 of the seat structure and support the bucket seat 11.

The oscillation of each crank arm 35 is resisted by the corresponding rubber spring 65, this movement of each of these crank arms 35 being transmitted through the pins 73 to the disk 70 vulcanized to the flat rear end face 68 of the rubber body 66 of each rubber spring. The forward end of each rubber body 66 is vulcanized to the convex anchoring plate 75, and hence the force so imposed on the rubber body is transmitted to the upwardly extending ears 81 of these convex metal anchoring plates 75. These two ears 81 are adjustably connected together by their swivel pins 82 and the reversely threaded screw 89 and hence it will be seen that these connected ears 81 provide a nonrotating anchorage for the forward ends of the rubber springs. When it is desired to increase the initial tension or windup of the springs the reversely threaded rod 89 is turned, through its handle 92, in a corresponding direction. In so turning, the upward extension of the drive pin 86a for the corresponding swivel pin 82 is caused to traverse the graduations 96 on the plate 95. These graduations are calibrated in accordance with the weights of different drivers. Accordingly, the driver can preadjust the seat to his own weight by turning the handle 92 until the pointer formed by the upward extension of the drive pin 86a registers approximately with his weight. This adjustment is preferably made before he sits upon the seat structure although this adjustment can be made, of course, while the driver is seated upon the seat structure. The position of the parts following a violent upward impact from the tractor is illustrated in Fig. 7.

Lateral tipping of the bucket seat 11 is prevented by the link 98 interconnecting the end plates 70 of the two rubber springs 65. This link pivotally connects the disks 70 of these two rubber springs to rotate in unison and since these plates 70 are fixed to the two fulcrum rods 42 by the pins 73, this link compels the two fulcrum rods 42 and their crank arms 35 to oscillate in unison. It will be noted that by the positioning of the link 98 as shown, the swinging movement of one crank arm can only occur when there is a corresponding movement of the other crank arm. At the same time, the bucket seat or saddle 11 is capable of lateral movement and this movement is yieldingly permitted by the flexible bodied spring leaves 25 which support the outer or crank pin ends 33 of the crank arms 35. It will also be particularly noted that these flexible bodied spring leaf connectors have the ability to accommodate the spreading and contracting of the outer or crank pin ends 33 of the crank arms 35 as the seat part of the seat structure falls and rises. This relative movement of these crank pins 33 with reference to each other is indicated by the vertical dot-dash line in Fig. 5. At the same time the use of these flexible bodied connectors 25 yieldingly holds the seat part of the seat structure in centered relation to the base part. This is an important feature since if shackles were substituted for the flexible bodied connectors, it will be seen that these shackles would merely flop over to one side or the other so that the suspension would become inoperative.

When the seat part 10 is so forced downwardly relative to the base part or base plate 20 from the normal loaded position shown in Fig. 6, or, conversely, when the base part 10 is forced upwardly relative to the seat part 20, the effective opposing force of the rubber springs 65 increases at a geometric and not at an arithmetic rate. In this particular case the geometric rate of change of resilient resistance is of the accelerated increase type in which increments of vertical movement of the base part are opposed by an accelerated rate of increase of resilient resistance. This is due to the progressive decrease in the effective leverage of the crank arms 35 as they swing downwardly and outwardly from the position shown in Fig. 6 to the position shown in Fig. 7 about their fulcrum rod axes of rotation. This action is also influenced by the fact that increments of vertical displacement of the outer ends of the crank arms cause accelerated rates of increase in the angular displacement of the rubber torsion springs 65. This latter is due to the fact that increments of vertical movement of the outer ends of the crank arms 35 are not proportional to the accompanying increments of angular twist to which the rubber springs are subjected.

This geometric action also occurs when the base part 20 moves downwardly relative to the seat part 10 from the position shown in Fig. 6 to the position shown in Fig. 5. Throughout this particular movement the geometric action is of the accelerated decrease type, that is, as the base part 20 passes through increments of downward movement the rate of decrease of the resilient force tending to push the seat part downwardly increases.

By this means, so far as vertical forces are concerned, the seat part 10 is free to "float" along solely under the influence of gravity (plus whatever vertical momentum forces are present) this feature being of particular significance when it is realized that the occupant is also, at this time, solely under the influence of gravity (plus whatever vertical momentum forces are present). The consequence is that within this particular range of movement the occupant of the seat moves vertically up and down with the same acceleration and deceleration as the seat part 10 and hence without changing the pressure between the occupant and the seat. Such a desirable result is quite different from that obtained from conventional seat suspension means in which the vertical drags jerks the seat down whenever the strains imposed on the seat part are negative. With the present seat suspension means no such forces tending to pull the seat downwardly are possible.

It will particularly be noted that by arranging the flexible bodied supports 25 at the side of the base plate 21 and with their broad faces extending fore-and-aft, a high degree of lateral cushioning or resiliency is imparted to the seat part 10 while at the same time these flexible bodied supports always tend to center the seat part 10, and do not permit such amplitude of movement as would interfere with the driver reaching his controls.

Further, the maximum elevation of the seat part 10 is determined by the simple expedient of the pins working in the slots 39 of the sleeves 32. The corresponding ends of these slots determine the degree of oscillation of the crank pins 33 in the directions which they must rotate as the seat part rises and hence determine the elevation to which this seat part can rise. These stops therefore are factors in determining the pretensioning or windup of the rubber torsion springs 65. As the handled screw 89 is turned to spread the ears 81 of the anchoring plates 75 of the two rubber springs 65, the rubber bodies 66 thereof are stressed to raise the seat part 10. With such raising stopped by the pins 38 engaging the shoulders 40 provided by the slots 39, further turning of the handled screw 89 serves to pretension the rubber bodies 66. A feature of the invention is the simple provision of a pointer and scale calibrated in terms of driver weights. The pointer is provided by an extension of one of the drive pins 86a for one of the swivel pins 82 carrying the handled screw 89. The driver merely sets this pointer to his approximate weight on the calibrated scale 96 and he is assured a good ride.

It will also be seen that features of the invention are the simple link 98 connecting the plates 70 and hence the fulcrum rods 42 to oscillate in unison and which hence eliminates lurching of the seat part; the simple bearing 63, 76 for the anchoring plate 69 of each rubber spring; the simple thrust bearing 78, 62, 61 and 60 for each of these last bearings to overcome the natural tendency of the rubber springs 65 to elongate axially; and the use of this same pair of stops 60 as the thrust abutments for the bearings 51.

We claim:

1. A seat structure, comprising a seat part, a base part, a pair of generally horizontal, generally parallel spaced fulcrum rods journalled in one of said parts, at least one normally generally horizontal crank arm fixed to each of said fulcrum rods and projecting toward the other of said parts, a movable member pivotally connecting the free end of each of said crank arms with the other of said parts, transverse plates severally fixed to said fulcrum rods and arranged substantially in a common plane extending perpendicularly to said fulcrum rods, a rubber body fixed at one end to one face of each of said transverse plates, an anchoring plate fixed to the opposite end of each of said rubber bodies, means interconnecting said anchoring plates to restrain rotation thereof, and means compelling said fulcrum rods to rotate in unison, comprising a link pivoted to each of said transverse plates and compelling said transverse plates to rotate in unison.

2. A seat structure as set forth in claim 1 wherein the pivotal connection between each of said transverse plates and said link includes a pivot pin having a head embedded in the corresponding rubber body and a shank projecting through openings in the corresponding transverse plate and in the adjacent end of said link.

3. A seat structure, comprising a seat part, a base part, a pair of generally horizontal, generally parallel spaced fulcrum rods journalled in one of said parts, at least one normally generally horizontal crank arm fixed to each of said fulcrum rods and projecting toward the other of said parts, a movable member pivotally connecting the free end of each of said crank arms with the other of said parts, transverse plates severally fixed to said fulcrum rods and arranged substantially in a common plane extending perpendicularly to said fulcrum rods, a rubber body fixed at one end to one face of each of said transverse plates, an anchoring plate fixed to the opposite end of each of said rubber bodies, a swivel pin rotatably secured to the marginal part of each of said anchoring plates to rotate about an axis parallel with said fulcrum rods, each of said swivel pins including an enlarged head provided with a threaded bore alining with the threaded bore of the other swivel pin head, an adjusting rod having reversely threaded ends severally screwed into said threaded bores, a pointer carried by one of said anchoring plates, and a plate carried by said one of said parts and having a calibrated scale traversed by said pointer.

4. A seat structure as set forth in claim 3 wherein said pointer comprises one end of a pin securing one of said swivel pins against axial displacement.

5. A seat structure, comprising a seat part, a base part, a pair of generally horizontal, generally parallel spaced fulcrum rods journalled in one of said parts, at least one normally generally horizontal crank arm fixed to each of said fulcrum rods and projecting toward the other of said parts, a movable member pivotally connecting the free end of each of said crank arms with the other of said parts, transverse plates severally fixed to said fulcrum rods and arranged substantially in a common plane extending perpendicularly to said fulcrum rods, a rubber body fixed at one end to one face of each of said transverse plates, an anchoring plate fixed to the opposite end of each of said rubber bodies, each of said anchoring plates being provided with an integral tubular hub surrounding the corresponding fulcrum rod, a bearing bushing press fitted in each of said hubs and rotatable on the periphery of the corresponding fulcrum rod, and means restraining rotation of said anchoring plates.

6. A seat structure as set forth in claim 5 wherein each bearing bushing has a radially outwardly projecting flange engaging the end of its hub opposite the corresponding rubber body, and wherein the side of each flange opposite its hub is engaged by a thrust washer held against displacement along its fulcrum rod by a radial projection from said fulcrum rod.

7. A seat structure as set forth in claim 6 wherein a thrust sleeve is interposed between each of said thrust washers and the corresponding radial projection.

8. A seat structure as set forth in claim 6 wherein said radial projections also severally serve as thrust abutments for the bearings journalling said fulcrum rods in said one of said parts.

9. A seat structure comprising a seat part, a base plate, a pair of generally horizontal closely spaced fulcrum rods journalled in said seat part to swing about horizontal axes extending fore-and-aft of the seat structure, a crank arm fixed to each of said fulcrum rods and projecting horizontally outwardly therefrom in the normal loaded condition of the seat structure, a crank pin at the free end of each crank arm and extending generally parallel with said fulcrum rods, an L-shaped spring leaf having a base part attached to said base plate and having its upper end formed to provide a cylindrical open-ended sleeve in which a corresponding crank pin is journalled, said L-shaped spring leaves being capable of flexure in a horizontal direction toward the fore-and-aft center of the seat structure, a transverse pin projecting from each of said crank pins through a slot in the corresponding open-ended sleeve, said slots being of such length that the ends thereof serve as stop shoulders for said transverse pin thereby to limit the upward movement of said seat part, relative to said base plate, and means yieldingly resisting vertical movement of said seat part relative to said base plate.

References Cited in the file of this patent

UNITED STATES PATENTS

| 2,156,507 | Means | May 2, 1939 |
| 2,562,082 | Brown | July 24, 1951 |
| 2,590,859 | Hickman | Apr. 1, 1952 |

FOREIGN PATENTS

| 957,338 | France | Aug. 22, 1949 |